United States Patent
Baryudin

(10) Patent No.: US 10,303,397 B1
(45) Date of Patent: May 28, 2019

(54) READ DISTURB HANDLING IN STORAGE DEVICES

(71) Applicant: Amazon Technologies, Inc., Seattle, WA (US)

(72) Inventor: Leonid Baryudin, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 15/605,729

(22) Filed: May 25, 2017

(51) Int. Cl.
*G06F 3/06* (2006.01)

(52) U.S. Cl.
CPC .......... *G06F 3/0659* (2013.01); *G06F 3/0613* (2013.01); *G06F 3/0679* (2013.01)

(58) Field of Classification Search
CPC ..... G06F 3/0659; G06F 3/0613; G06F 3/0679
See application file for complete search history.

(56) References Cited

U.S. PATENT DOCUMENTS

| | | | |
|---|---|---|---|
| 2013/0132647 A1* | 5/2013 | Melik-Martirosian | G06F 12/0246 711/103 |
| 2016/0141044 A1* | 5/2016 | Sun | G11C 16/10 365/185.11 |
| 2017/0286288 A1* | 10/2017 | Higgins | G06F 12/0246 |
| 2017/0371559 A1* | 12/2017 | Higgins | G06F 3/0611 |
| 2018/0165022 A1* | 6/2018 | Tomic | G06F 3/0619 |
| 2018/0217769 A1* | 8/2018 | Nagahara | G11C 16/3427 |

* cited by examiner

*Primary Examiner* — Ryan Bertram
(74) *Attorney, Agent, or Firm* — Klarquist Sparkman, LLP

(57) ABSTRACT

Management of a nonvolatile medium, such as a flash memory, is disclosed. The nonvolatile medium can be organized as a plurality of storage units. The storage units used to store user data in the form of logical units (sectors). For purposes of read disturb handling, the logical units need to be copied out of the storage unit and thus invalidated prior to hitting a read disturb limit. Rather than waiting until the read disturb limit is reached and copying out all of the logical units at once, the logical units are moved gradually over a period of time based, in part, on a number of valid logical units. A number of reads can also be used to determine when logical units are moved. Distributed movement of the logical units avoids an avalanche effect wherein multiple logical units need to be moved at once, which slows the overall system.

19 Claims, 10 Drawing Sheets

US 10,303,397 B1

READ DISTURB HANDLING IN STORAGE DEVICES

BACKGROUND

Virtualized computing environments are frequently supported by storage. Such storage is increasingly provided by solid state drives (SSDs). SSD manufacturers incorporate a controller that provides a block-style interface and that manages data storage and mapping. For example, read or write requests can include a logical block address associated with the request. The controller can determine a physical location on the SSD from where the data should be read or written. The controller can also manage data storage on the SSD to improve longevity and manage other functions.

Some SSDs, such as with Flash memory, can have limitations on reading memory cells. For example, a read of a memory cell can cause nearby cells to change over time (the phenomenon known as "read disturb"). Flash manufacturers provide a threshold number of reads (a Read Disturb Limit (RDL)) after which such changes might become uncorrectable. Before RDL is reached, an SSD controller has to ensure that there is no valid data in the impacted block—e.g., that it was either overwritten by the Host or copied by SSD controller itself over to a new block. Otherwise, data loss can occur. Many blocks can hit the RDL threshold number of reads at about the same time, which causes an "avalanche" of copies of blocks to new blocks. Such an effect can significantly impact the performance of the SSD.

DETAILED DESCRIPTION

Overview

Figure 1:
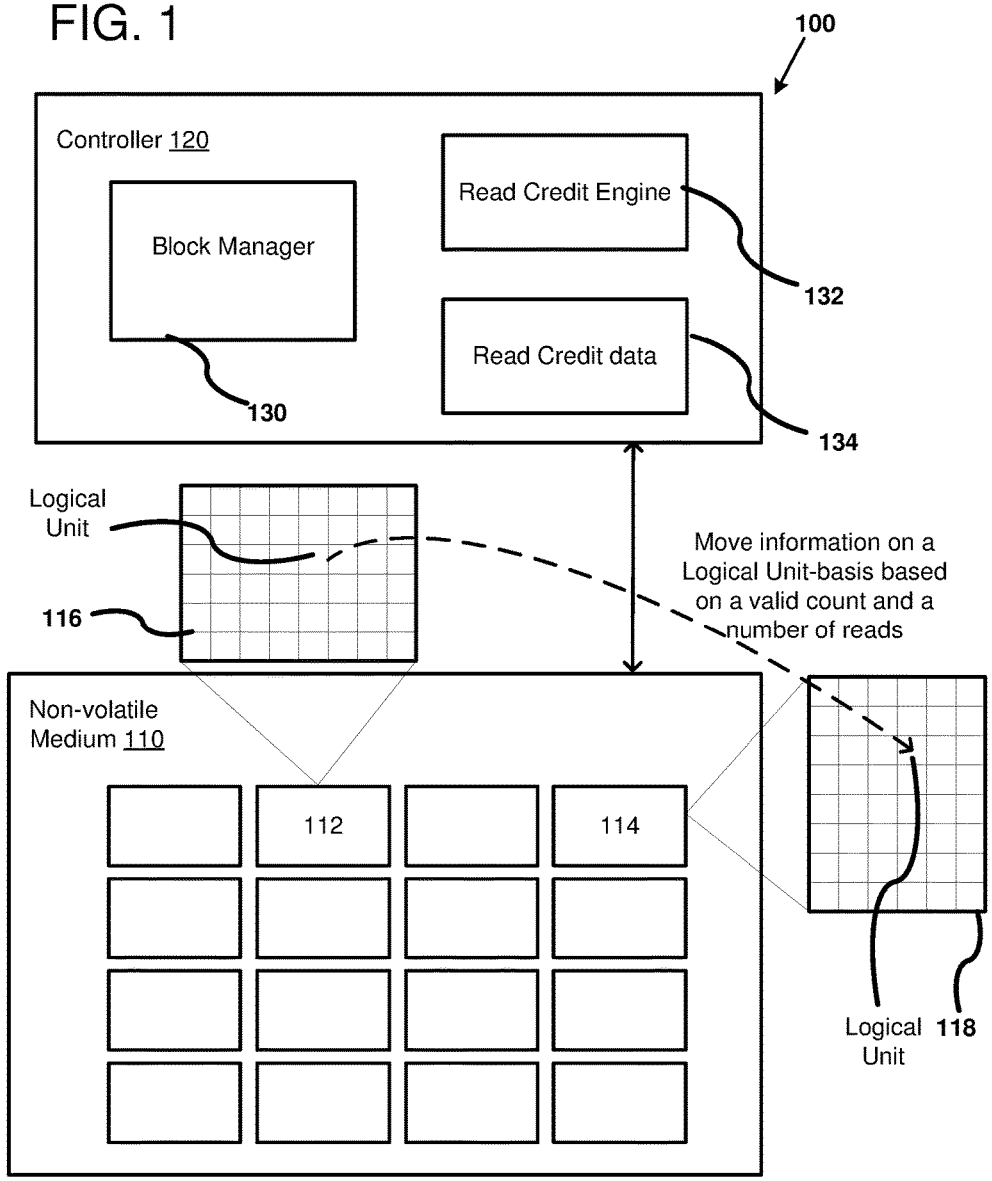
FIG. 1 is a system diagram showing an example of a nonvolatile storage device including a controller and a nonvolatile medium.

Management of a nonvolatile medium, such as a flash memory, is disclosed. The nonvolatile medium can be organized as a plurality of storage units (SUs) (often called "blocks"). The SUs can be subdivided into a plurality of logical units. For purposes of read disturb handling, the logical units (LUs) (often referred to as "data sectors" and addressed by a Host using Logical Base Address—LBA) can be copied out of the SU or invalidated due to the Host writing new instances of these LUs prior to hitting a Read Disturb Limit (RDL) by the SU. Rather than waiting until the read disturb limit is reached and copying out all of the LUs at once, the LUs are moved gradually over a period of time based, in part, on a number of valid LUs in that SU. A number of reads can also be used to determine when LUs are moved. Distributed movement of the LUs avoids an avalanche effect wherein multiple LUs are moved at once, which slows the overall system.

A nonvolatile medium (also referred to as a nonvolatile memory or NVM) is a computer-readable memory that retains information stored after power is removed from the nonvolatile medium. Rewriteable nonvolatile memory can be used as general purpose storage at one or more levels of the memory hierarchy of a computer system. Examples of solid-state rewriteable nonvolatile memory include Flash memory, electrically-erasable programmable read-only memory (EEPROM), ferroelectric random-access memory (FRAM), and magnetoresistive random-access memory (MRAM).

The nonvolatile memory can be organized in various arrangements based on a desired access time and/or access pattern of the memory. For example, a NAND flash memory can be organized into multiple physical blocks, where each physical block contains multiple flash memory cells that are all erased at the same time. A physical block can contain many bytes of information which can be partitioned into smaller groups of information. For example, the information stored on the physical block can be arranged in pages, where a page is typically the smallest amount of information that is written to or read from the flash memory in a given operation. As a specific example, a two gigabyte (GB) NAND flash memory can be arranged into 2,048 blocks (storage units), where each block is divided into 64 pages. As another example, NAND flash memories can be arranged in 600-700 pages per block, where the page size is eight kilobytes to sixteen kilobytes with 8% to 12% additional space for ECC parity words. The information read from a page of the flash memory can be transferred from the flash memory a byte or a word at a time. Similarly, the information written to a page of the flash memory can be transferred to the flash memory a byte or a word at a time. A physical block in flash memory can be a SU. However, a LU is typically not equal to a flash memory page, as an LU is based on the size of the content.

Unlike some memory technologies that can be reprogrammed by merely overwriting a new value over an old value, a flash memory cell can be programmed (e.g., written) only after it is erased. In order to reprogram the flash memory cell, the entire physical block containing the cell is erased before the cell can be written with a new value. As described above, the physical block (storage unit) can contain many pages with user data written in the form of LUs (sectors). In order to retain all of the information stored on the block, the information stored on any valid LUs within the block should be copied outside of the block before the block is erased. However, moving data from one location to another location causes overhead and decreases performance of a storage system.

The information stored on the flash memory can be moved for various reasons such as maintaining the integrity of the information stored on the flash memory. Each flash memory device has a finite amount of storage capacity (e.g., 2 GB). As a computer system uses the flash memory, the storage locations of the flash memory can be filled with both valid information and invalid information (the latter one being plurality of old, "stale" instances of the LUs for which more recent copies exist elsewhere in the system). The status of the information can be tracked at a granularity of a LU, so that each LU can be classified as valid or invalid. Valid LUs include information that can be used by an application to perform a function of the application. For example, the valid information can include instructions of an application or data used by an application. Thus, the information of a valid unit should be available at a different location before erasing a block containing the valid LU to avoid potential data loss. For example, a valid logic unit can be programmed at another location before erasing the block containing the valid LU. Invalid logic units can include information that cannot be used or is not needed by an application to perform a function of the application. Also, once all valid data is copied to a new block, the original block can be erased. The information stored on invalid LUs can merely be discarded when a block containing the invalid logic units is erased. Because the physical blocks can contain multiple pages with many LUs in them, each of the blocks can include both valid and invalid LUs. Moving the valid LUs onto a common set of blocks with other valid LUs (generally referred to as "garbage collection") can potentially increase a number of the blocks, available for erase and for storing new information. The blocks containing only invalid LUs whose information has been moved elsewhere can be erased and reprogrammed with new valid data.

Additionally, the information stored in the pages of the flash memory may be moved so that the integrity of the data is maintained. The integrity of the data can be affected by environmental conditions, manufacturing variances, and operational conditions of the flash memory. For example, the information stored or programmed in a flash storage cell can potentially be corrupted when neighboring cells are read and/or when the device is subjected to high temperatures or is struck by an alpha particle or neutron. Thus, a charge or signal representing the information stored within a flash memory cell can degrade each time the block is accessed until the information is no longer recoverable. In one solution, a number of reads to a physical block can be tracked, and valid information stored within the block can be copied to a different block when the number of reads to the block exceed a certain threshold. By moving the information after a predefined number of reads, the information can be moved before it is corrupted due to an unintentional disturb caused by reads within the block.

Non-volatile Media, such as NAND Flash memory, can be more generically described as including a plurality of SUs and a controller that maintains the SUs. The SUs includes a plurality of LUs, wherein each LU includes one or more sectors of user data. The phenomena of data loss, described above, through reading is often called Read Disturb (RD) as read operations tend to "disturb" previously written data. In general (but not necessarily), an amount of read accesses to the particular SU grows as its valid count (VC) grows (the VC is equal to a number of valid LUs in an SU) simply because there is more data to read and more chances for read operation from that SU taking place. Therefore, invalidating an LU by creating a new instance or copying it elsewhere mitigates effects of such "read induced" degradation. When VC reaches zero, no further reads may happen and an erase of the SU could be performed to ready it for reuse.

In many embodiments such data movement starts when number of reads from SU reaches a certain threshold, known as Read Disturb limit (RDL). The drawback of such an approach is a possible introduction of spikes in the number of reads due to massive amounts of data relocation that can occur in clusters. For example, multiple SUs can achieve the read disturb limit almost simultaneously, resulting in an "avalanche" of LU relocations.

In one embodiment, valid LUs are relocated gradually, as a function of an SU's valid count. In some embodiments, an SU maintains a level of VC inversely proportional to the amount of reads. For example, the VC can be proportional to an amount of reads remaining to reach a Read Disturb Limit (RDL). The following formula can be used, for example:

$VC[SU] \sim (RDL-sm-RDC[SU])/f_{rw}$;

wherein $f_{rw}$ is a Rewrite Factor, which can be as follows: $f_{rw}=(RDL-sm)/VC_{max}$;

in some embodiments the Rewrite Factor is relatively large, for example, $f_{rw} \sim 10^2$--$10^4$; wherein RDL is a constant that manufacturers of the non-volatile media use as a limit on an amount of reads;

wherein sm is a safety margin and is a constant;

wherein RDC is a Read Disturb Count, which is a current count of reads of an SU; and wherein $VC_{max}$ is a maximum number of valid LUs (e.g., a total number of pages in a block).

As a result, $VC[SU] \sim VCmax-RDC[SU]/(RDL-sm)$.

Therefore, LUs are being moved gradually, by relatively small portions, before the RDL is reached so as to avoid a spike of moving LUs at any one time. Before a number of read operations from any SU reaches a dangerous RDL level, the SU may not have any valid LUs in it (due to VC approaching 0) and read accesses to the SU naturally cease. Also, data movement is substantially distributed in time.

Example Architectures for Managing a Nonvolatile Medium

Figure 2:
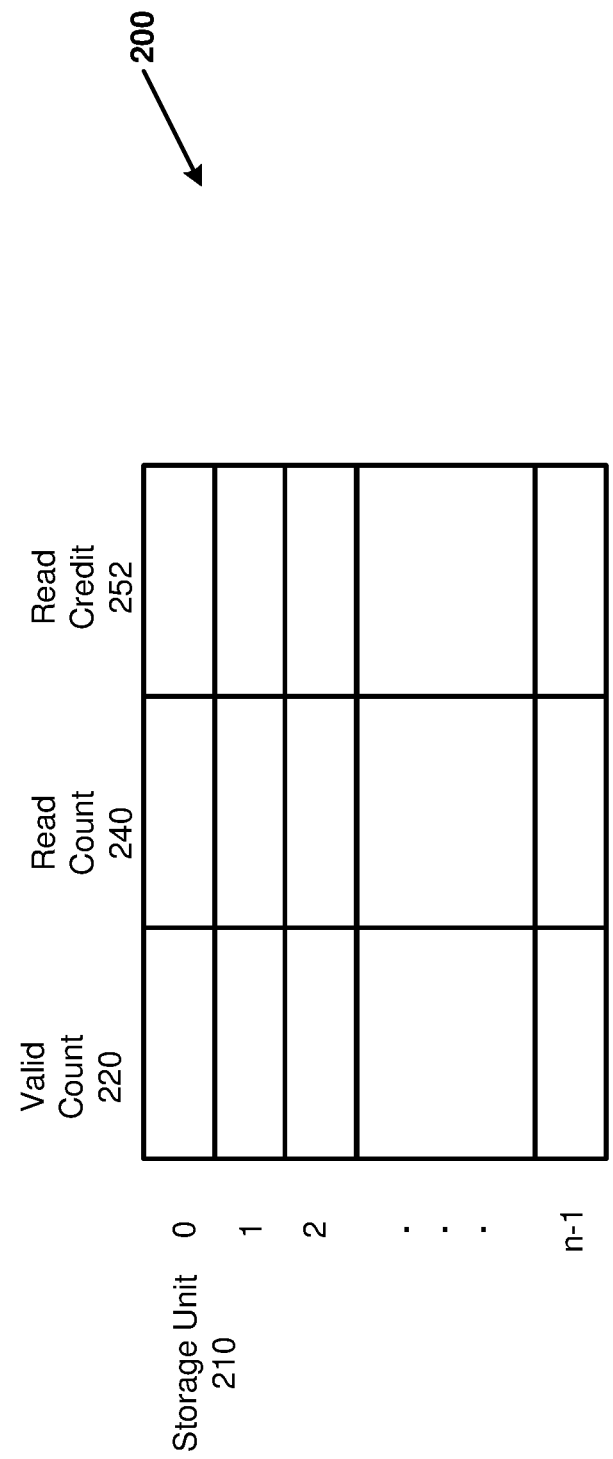
FIG. 2 illustrates an example of various data structures for managing the storage locations and the information stored on a nonvolatile medium.
Figure 3:
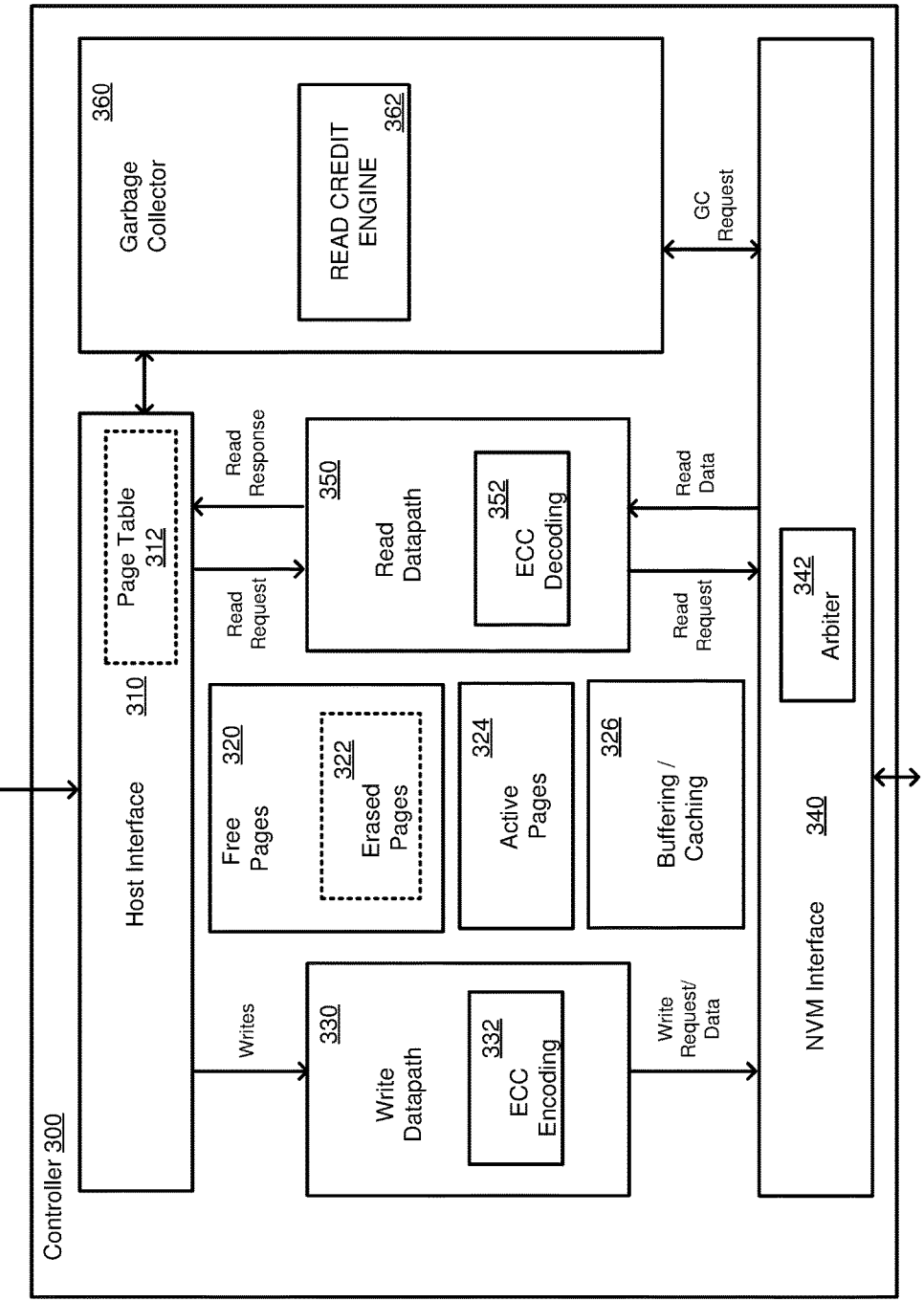
FIG. 3 is a system diagram showing an example of a controller for a nonvolatile storage device.
Figure 4:
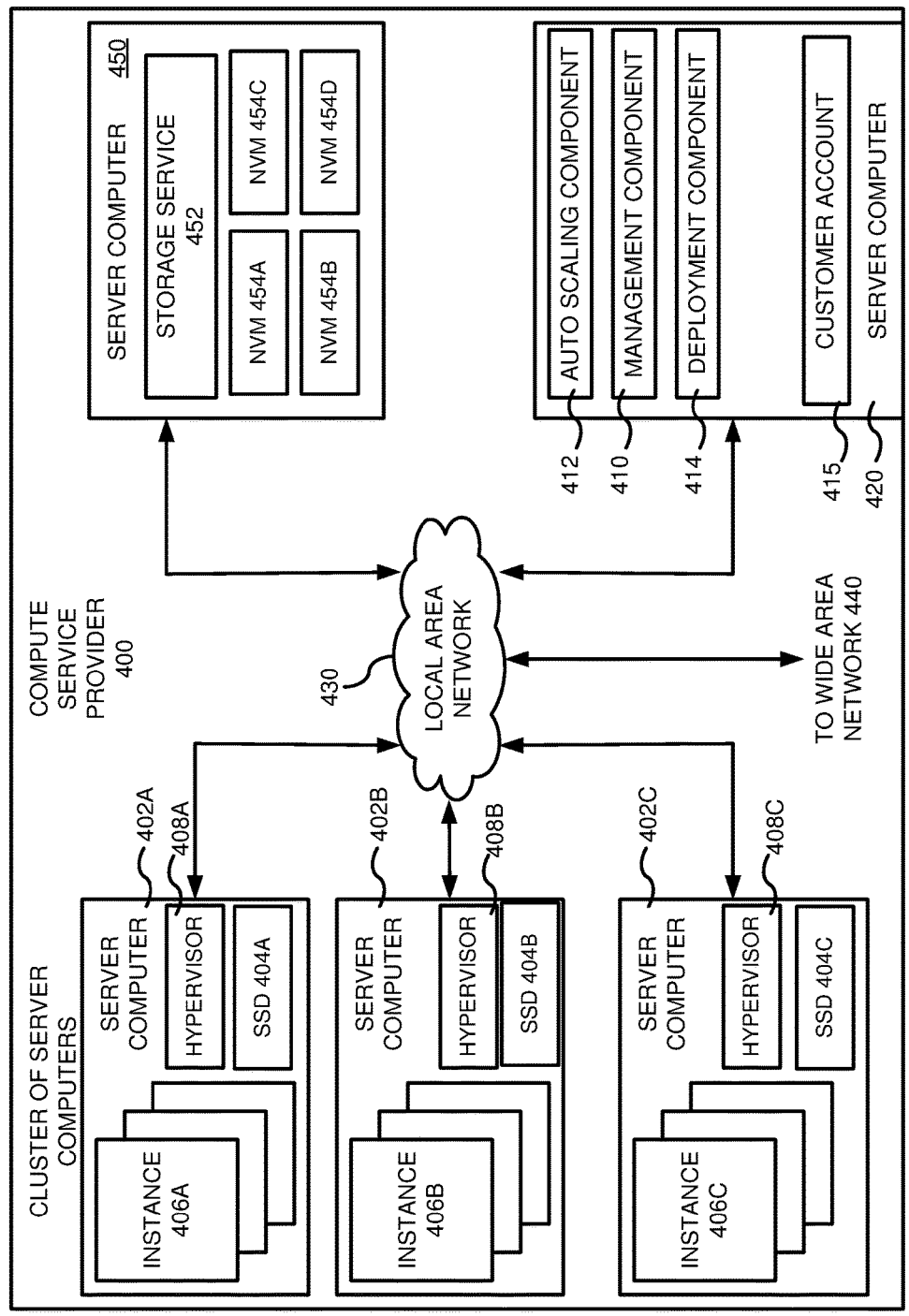
FIG. 4 is an example system diagram showing a plurality of virtual machine instances running in a multi-tenant environment including a storage service.

FIGS. 1-4 illustrate various aspects of an architecture for managing information stored on a nonvolatile medium. FIG. 1 is a system diagram showing an example of a nonvolatile storage device, such as a solid-state drive (SSD), including a controller and a nonvolatile medium. FIG. 2 illustrates various example data structures that can be used for managing the storage locations of the nonvolatile medium and the information stored on the nonvolatile medium. FIG. 3 is a system diagram showing an example of a controller for the nonvolatile storage device. FIG. 4 is an example system diagram showing an example multi-tenant environment (e.g., a cloud environment). The multi-tenant environment can include server computers that access local nonvolatile storage and/or network-accessible (e.g., remote) nonvolatile storage using a storage service.

FIG. 1 is a system diagram showing an example of a nonvolatile storage device 100 including a nonvolatile medium 110 and a controller 120. The nonvolatile medium 110 can be implemented using a variety of technologies, such as solid state storage devices (e.g., NAND-type flash devices and NOR-type flash devices), EEPROM, Ferroelectric RAM, and/or other technologies used for storing information that is retained after power is removed from the device, such as a hard disk drive or other magnetic storage. In another example, the storage device comprises a combined solid state storage and magnetic storage.

The nonvolatile medium 110 can include multiple SUs (e.g., physical blocks in the case of flash memory), such as SU 112 and 114, for storing information. Each of the SUs can be organized as multiple LUs, as shown at 116, 118 and each SU can be erased in a single operation. For ease of illustration, the nonvolatile medium 110 is described below in terms of flash memory, the SUs are referred to as blocks. However, it should be understood that the embodiments described herein can also apply to other nonvolatile media. The nonvolatile memory 110 can further include control logic (not shown) for receiving commands from the controller 120. For example, the commands can include commands for reading a page of information, programming or writing a page of information, moving a page of information from one page to another page, and erasing a physical block.

The controller 120 can include hardware and/or software for interfacing with a host device (e.g., a server computer) (not shown) and for managing the nonvolatile medium 110. As one example, the controller 120 can include a processor and memory used for storing data and instructions for managing the nonvolatile memory 110. As another example, the controller 120 can include circuits (e.g., computer hardware, such as an application-specific integrated circuit (ASIC)) that are programmed or hard coded to perform functions for managing the nonvolatile memory 110. The controller 120 can further act as an interface between a host device and the nonvolatile medium 110. For example, the controller 120 can receive information from the host device to be written to the nonvolatile medium 110 and the controller 120 can cause the information to be stored on the nonvolatile medium 110. The controller 120 can receive a request from the host device to retrieve information that was stored on the nonvolatile memory 110 and a controller 120 can cause the information to be read from the nonvolatile memory 110 and delivered to the host device. Additionally, the controller 120 can perform management functions associated with the nonvolatile memory 110, such as maintaining the integrity of information stored on the nonvolatile memory 110, maintaining a mapping of host addresses (such as Logical Base Addresses—LBAs) to physical addresses of the nonvolatile memory 110, and managing placement of the information within the available storage locations (e.g., the physical blocks) of the nonvolatile memory 110. In particular, the controller 120 can include a block manager 130, a read credit engine 132, and read credit data 134.

The block manager 130 can manage how the LUs and/or blocks within the nonvolatile memory 110 are used. For example, the block manager 130 can maintain a "free-list" of blocks, for example, those that do not contain any stored valid information. The free-list can include blocks that are erased and are ready to receive write data and blocks that contain data that is no longer valid and that will be erased before the block can be reprogrammed. The block manager 130 can erase the blocks with invalid information at predefined intervals or during idle periods when the host device is not requesting information be written to or read from the nonvolatile memory 110. The block manager 130 can select blocks from the free-list in a manner to increase a longevity of the nonvolatile memory 110. For example, the block manager 130 can select less frequently used blocks from the free-list before using more frequently used blocks so that the program-erase cycles can be leveled between the different blocks. As another example, the block manager 130 can maintain an active-list of LUs that contain valid information. The LUs listed in the active-list can be referred to as active LUs and the number of LUs in the SU is called a valid count (VC) of that SU. The active-list can include references to all or a subset of the valid LUs. As one example, the active-list can include references to LUs that have recently been written to or read from. The entries of the active list can include a mapping from a host address to a physical address of the nonvolatile memory 110.

The block manager 130 can further communicate with the read credit engine 132 and determine when to copy an LU from one block to another in order to proactively control the blocks within the nonvolatile medium so as to maintain the blocks below the read disturb limit. For example, the read credit engine 132 can transform data, such as a number of reads and a valid count, into a so-called "read credit" value, associated with each block (SU). The so-called read credit variables can then be stored in read credit data 134. The block manager 130 can control when LUs are moved from one block to another. For example, the block manager 130 can gradually copy information from LU 116 to LU 118 based on a valid count and a read count. Such gradual data movement avoids problems of an "avalanche" condition where all data which is still valid in a SU has to be moved after a read disturb limit is reached. Instead, the block manager 130 can maintain a substantially constant proportionality between the valid count and the number of reads, if necessary, by copying some LUs out of the SU and thus reducing the valid count if the valid count doesn't naturally reduce fast enough as the number of reads increases (such "natural" reduction also called "decay" is happening every time the Host writes a new copy of the same LU in a different physical location during which time the old copy gets invalidated and VC of the SU where the old copy was gets reduced without any perforce data movement). For example, block 112 can have an individual LU copied to block 114, but after the LU is copied, intermediate reads can occur to block 112 or even writes to block 112 (if it has not been completely written) after the LU is copied and before a next LU is copied. Thus, the block 112 remains fully functional and active despite that the block manager 130 is gradually moving valid LUs to block 114. Each block 112 can have an associated read credit, which is stored in the read credit data 134. Thus, before any read operations from a block could result in a read disturb limit being reached, the block will already have its valid LUs subsequently invalidated either due to natural decay or as a result of copying out. Copying of data (if it is happening at all) is resultantly distributed rather evenly over a prolonged time period.

The algorithm performed by the block manager 130 and the read credit engine 132 can be as follows: a read credit (RC) is assigned to each SU when it's still empty (erased) with initial value RC[SU]=RDL−sm. Each time VC increases by 1 (LU is written into the SU), RC[SU] is decremented by $f_{rw}$ (a constant). Each time SU is being read, RC[SU] is decremented by 1. Each time VC decreases by 1 (new instance of this LU created by Host or LU is moved out of SU intentionally) RC[SU] is incremented by $f_{rw}$. If RC[SU]≤−rda, where rda<<sm<<RDL and where rda is called Read Disturb Allowance (rda), chose an LU in this SU and move it elsewhere. As a result, RC[SU] increases by $f_{rw}$ (because VC decreases by 1—see above), which pauses data movement related to the read disturb handling and allows normal operation of the non-volatile medium 110. If RC[SU]+sm≤$f_{rw}$ additionally block reads from this SU, which is a safety measure to guarantee that a vendor-defined RDL is not reached.

In certain embodiments the information is available regarding frequency of read accesses to certain LBA ranges (that is, certain groups of LUs). In such cases LU candidates for relocation will be selected from most frequently read LBA ranges. That will reduce the speed of RC[SU] decreasing (since remaining LUs are probabilistically being read less often), reducing chances of future data movements and associated overhead.

FIG. 2 illustrates an example of various data structures for managing the storage locations and the information stored on a nonvolatile medium, such as the nonvolatile medium 110 of FIG. 1. The data structures can include a table 200.

The table 200 can include various information about each of the SUs of the nonvolatile medium. For example, the table 200 can include an entry for each of the SUs 210 of the nonvolatile medium. As one example, an entry of the table 200 can include a valid count 220 a read count field 240, and/or a read credit 252. The valid count 220 can indicate the number of valid LUs in each SU, which can vary from 0 (when there are no valid LUs) to $VC_{max}$, which equals size (SU)/size (LU). The read count field 240 can include a measure of how often the LU is accessed. The read count field 240 can be used to determine a relative frequency that the LU is accessed. The relative access frequency of the LUs can be calculated at various intervals. For example, the relative access frequency can be calculated at a predetermined time interval or after a predetermined number of reads.

For the valid count 220, if a new instance of LU is written by Host to another location or an LU is copied out of the block for purposes of read disturb handling, the valid count 220 is decreased for that block. Alternatively, if a new page is used within the block, then the valid count increases. As described above, a read credit field 252 is computed using the valid count 220. As such, the controller makes decisions whether to move valid LUs out of the block based on the valid count. The read credit engine 132 can compute the read credits for each block and store the computed values in the read credit field 252, which can be stored in the controller, as shown in FIG. 1, at 134, or outside of the controller in memory. The read credit values 252 provide an advantage of having only a single table upon which a determination can be made whether to move data out of a block due to the read disturb limit. However, alternative structures can be used including using the read count 240 and the valid count to make the determination. Having the read credit field 252 allows the read count 240 and the valid count to be eliminated from tables if desired. Those skilled in the art understand that there are multiple data structures that can be used to implement the read disturb handling described herein based on the valid count and the illustrated table 200 is one example structure.

FIG. 3 is a system diagram showing an example of a controller 300 used to manage a nonvolatile medium and to act as an interface between a host device and the nonvolatile medium. The controller 300 can include hardware and/or software for interfacing with a host device and for managing a nonvolatile medium. As one example, the controller 300 can include a processor and memory used for storing data and instructions for managing the nonvolatile memory and interfacing with the host device. As another example, the controller 300 can include circuits (e.g., computer hardware) that are programmed or hard coded to perform functions for managing the nonvolatile memory and interfacing with the host device. The controller 300 can include a host interface 310 for interfacing with the host device, a nonvolatile memory interface 340 for interfacing with the nonvolatile medium, and a garbage collector 360 for performing various management functions associated with the nonvolatile medium without interaction from the host device.

The host interface 310 can receive and service commands received from one or more host computers. In particular, the host interface can receive a write command for writing data to the nonvolatile medium, a read command for reading data from the nonvolatile medium, and a delete command for deleting data from the nonvolatile medium. Each command can refer to a particular storage location using an address for the location. The host device can use a set of logical addresses (e.g., virtual addresses) which can be translated to physical addresses corresponding to storage locations of the nonvolatile medium. The host interface 310 can perform a mapping between the logical and physical addresses and the mapping information can be stored in a page table 312. For example, the host interface 310 can select a page from the free pages 320 for storing information when the host interface 310 receives a write command. The free pages 320 can include erased pages 322 that are ready for programming and pages that are free but not yet erased. A reference to the selected page can be added to the active pages 324 when the information is written to the nonvolatile memory. As another example, the host interface 310 can determine the physical address corresponding to a logical address of a read command by searching the page table using the logical address as a key.

The host interface 310 can communicate write requests to a write data path 330. The write data path 330 can format the write information for storage onto the nonvolatile memory. For example, the write data path 330 can include an error correcting code (ECC) encoding engine 332 for adding ECC information to the write data. The ECC information can be used to detect and potentially correct any errors in the write data that are introduced while the data is stored on the nonvolatile medium and/or when the data is a read off of the nonvolatile medium. The write request can be forwarded by the write data path 330 to the nonvolatile memory (NVM) interface 340.

The NVM interface 340 can arbitrate (such as by using an arbiter 342) between different requests of the controller 300. For example, write requests can arrive while read requests are being processed and garbage collection requests can be ongoing with read and write requests. The nonvolatile medium may have a single interface and so different computing requests are sequenced before being sent to the nonvolatile medium. A buffering and caching block 326 can be used to temporarily store data from a request that is waiting to be serviced. Additionally, the buffering and caching block 326 can include storage space for recently and/or commonly requested data. The NVM interface 340 can communicate with the nonvolatile medium using commands to perform functions such as reading a page, programming or writing a page, moving information from one page to another page, and erasing a block. Additionally, the NVM interface 340 can sequence the write data and/or the read data between the controller 300 and the nonvolatile medium. In this manner, the NVM interface 340 can be used to write information to the nonvolatile medium, read information from the nonvolatile memory, and manage the stored information within the nonvolatile memory.

The host interface 310 can receive a read request from the host device and communicate the read request to a read data path 350. The read data path 350 can forward the request to the NVM interface 340 so that the requested data can be read from the nonvolatile medium. The read data path 350 can check the read data returning from the nonvolatile medium to confirm whether the read data includes any errors. If errors are detected, the read data path 350 can potentially correct the errors before forwarding the read response data back to the host interface 310 and then on to the host device.

The read data path 350 can include an ECC decoder 352 for performing error detection and error correction algorithms (such as LDPC decoding algorithms) to detect and/or correct erroneous information that is read from the nonvolatile medium. An LDPC decoding algorithm can use different levels of read retry steps, such as hard decoding and soft decoding. During hard decoding, only hard bit information is used to decode the data. Hard decoding may have weaker error correction capability than soft decoding, but hard decoding has relatively shorter latency (e.g., read time to) and consequently higher throughput. The ECC decoder 352 can be designed to follow a deterministic flow and so the actual read latency for each read retry step can be a known design parameter. Thus, the read time can be predicted for each page/block by tracking the number of different levels of read retries for each page or block. Additionally, the number of levels of read retries for a given page can trigger data movement from the page when the number of levels of retries exceeds a latency limit for the page.

The ECC decoder 352 can begin by using hard decoding (taking to read time) and transition to soft decoding only when hard decoding fails to decode the read data. Most read data is likely to be successfully decoded using only hard decoding. However, as the data integrity for the information weakens (such as when there have been many reads to the same page), additional steps including soft decoding can be performed. Soft decoding can perform additional soft bit reads and use both hard bit and soft bit information to decode the data. Hence, soft decoding can have stronger error correction capability but longer latency and lower throughput than compared with hard decoding alone. As one example, a read retry flow design can have the read retry steps $RR_i$, where i=1, 2, . . . , n having corresponding read time numbers $t_i$, where $t_0 \ll t_1 \ll t_2$, and so forth. As one example, the exact number of read retry steps can be measured and recorded for each page. As another example, the number of read retry steps can be recorded with less precision for each page, since generally only those read retry steps with a read time approaching the latency step size as specified in a given strata of an SLA may be of relevance. The number of retries can be recorded for a particular page, a particular block, or a particular management unit. Specifically, the number of retries within a given number of reads of the nonvolatile medium can be recorded for a given management unit.

The garbage collector 360 can perform various management tasks associated with the nonvolatile medium. For example, the garbage collector 360 can: schedule free and non-erased LUs to be erased so that the LUs can be reprogrammed; and schedule the movement of information within the nonvolatile medium. Movement can be based on computations by a read credit engine 362. In particular, the read credit engine 362 can use data related to the active pages 324 to determine a valid count. The valid count can then be used, at least in part, to determine whether LUs should be moved based on read disturb handling. In some embodiments, both the valid count and a number of reads from a block can be used in determine whether a LU should be moved or not. In particular, a ratio between the valid count and the number of reads can be maintained within a proportionality range so as to evenly distribute the movement of valid LUs out of a block. Thus, even without a read disturb limit being reached, movement of LUs can be distributed over an active period of a block between erasures.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402C. While only three server computers are shown, any number can be used, and large centers can include thousands of server computers. The server computers 402A-402C can be selected from a set of homogeneous or heterogeneous resources. As illustrated, the server computers 402A-402C include local bulk storage using solid-state drives 404A-404C, respectively. The server computers 402A-402C can provide computing resources for executing software instances 406A-406C.

In one embodiment, the instances 406A-406C are virtual machines. As known in the art, a virtual machine is an instance of a software implementation of a machine (i.e. a computer) that executes applications like a physical machine. In the example of virtual machine, each of the servers 402A-402C can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 450 can be configured to execute a storage service 452. The storage service 452 can receive requests from the instances 406A-C to store and retrieve information using bulk storage devices accessible to the storage service 452. For example, the bulk storage devices can include nonvolatile media 454A-D. While only four nonvolatile media 454A-D are shown, any number can be used. The individual bulk storage devices can be reserved for a particular user and/or can be shared by the users of the compute service provider 400. As a specific example, all or a portion of the nonvolatile memory 454A can be reserved for the use or executing instance 406A. As another example, the storage service 452 can allocate storage resources among the different nonvolatile memory 454A-D in a customer independent manner. The storage service 452 can manage the nonvolatile media 454A-D as described above. The storage service 452 can further manage SSD 404A-C located on the individual server computers 402. Various embodiments of the disclosed technologies can be used in block storage systems, object storage systems, or other types of storage systems.

One or more server computers 420 can be reserved for executing software components for managing the operation of the server computers 402 and the instances 406. For example, the server computer 420 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. A network 430 can be utilized to interconnect the server computers 402A-402C and the server computers 420 and 450. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

Example Methods for Managing a Nonvolatile Medium

Figure 5:
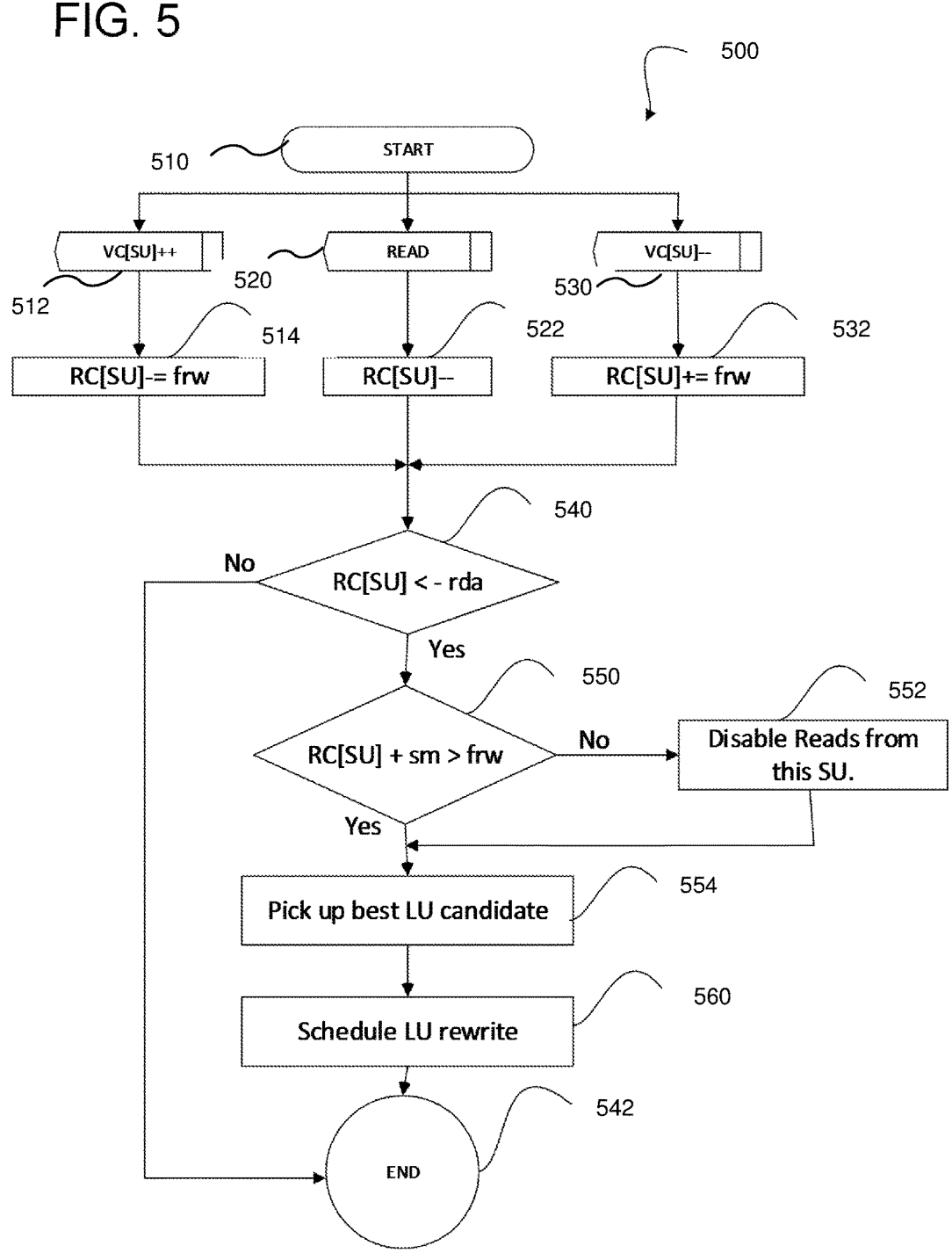
FIG. 5 is an example flowchart according to one embodiment for determining when to copy a logical unit from a storage unit.

FIG. 5 is an example flowchart 500 according to one embodiment for controlling read disturb handling of a nonvolatile medium. The process starts at 510 wherein one of three events can occur to the nonvolatile medium: a new LU can be written to, an LU can be read, LU can be invalidated as because it has been rewritten by another process or because it has been "moved" out of a block by being copied to another block. In process block 512, a valid count of the particular is increased due to a new page being written to that block. As a result, a read credit variable is decreased by a constant $f_{rw}$ which was defined above, as shown at 514. $f_{rw}$ is usually a large number relative to a simple decrement (it's a ratio between RDL and VCmax). For example, $f_{rw}$ can change the read credit by 1000 while a read can result in a simple decrement of the read credit. Other constant values can be used. In process block 520, a read can occur of the nonvolatile memory. As a result, the read credit is decremented by 1, as shown at 522. In process block 530, a LU is invalidate due to one of reasons, specified above. As a result, the valid count is reduced by 1. Such a reduction results in an increase of the read credit as shown at 532 by the same factor $f_{rw}$. Thus, intermediate moves of LUs from the nonvolatile medium provides for a large number of additional reads without violating the read disturb limit.

In decision block 540, a check is made whether the read credit fell below a constant, shown as a read disturb allowance (RDA). If not, then the process exits at process block 542. If decision block 540 is answered in the affirmative, then in process block 550, a check is made whether the read credit is at a low value $f_{rw}$, which is a constant. If read credit has fallen too low, then at process block 552, reads are disabled from the block, and any remaining valid LUs are to be moved. If the read credit is maintained at a satisfactory level, then at 554, a best candidate valid LU is selected for movement. For example, a valid LU that has been read the most of the remaining valid LUs can be selected. Other criteria can be applied. Once the selection is made, then in process block 560, a rewrite of the LU is performed. The process then exits at process block 542. Events for the block can then continue and any event for a block starts the process over again at process block 510. Thus, only one LU can be moved between reads or changes in the valid count so as to distribute LU moves over a longer period of time than traditional systems.

Figure 6:
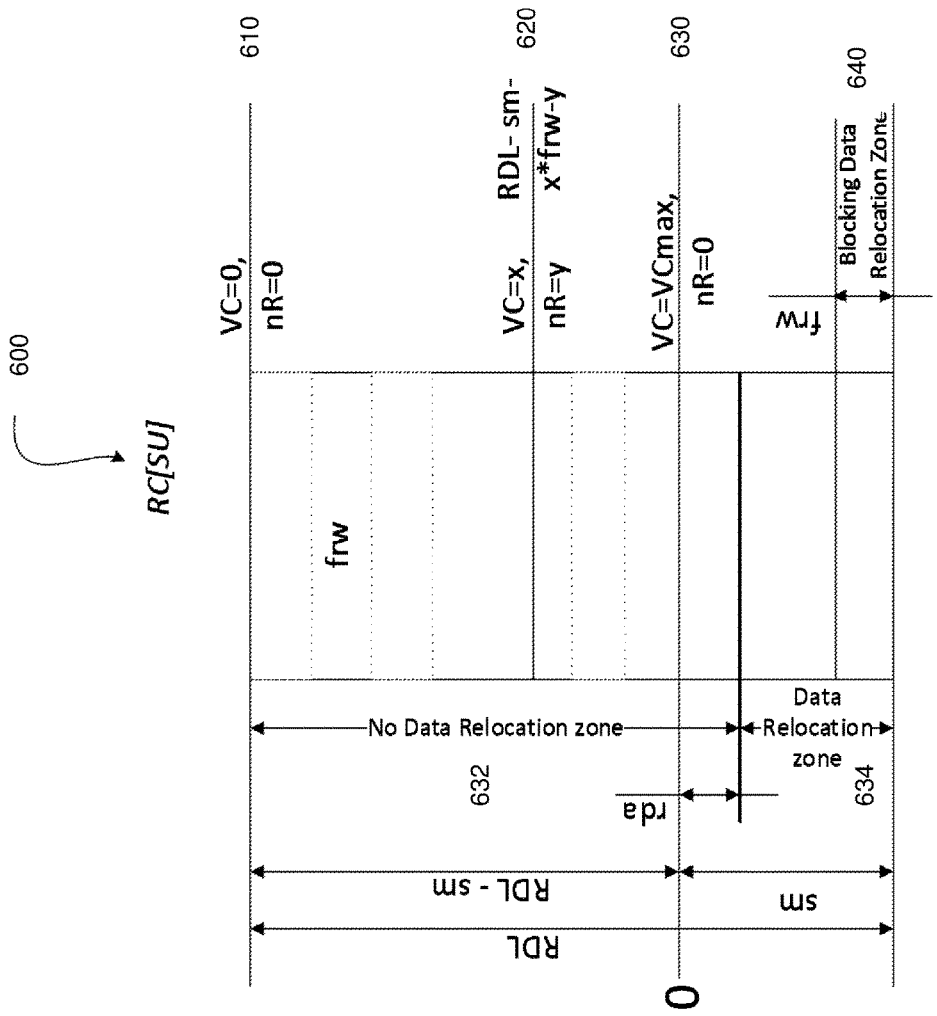
FIG. 6 is a diagram showing a read credit variable used to relocate data gradually from a storage unit.

FIG. 6 is diagram illustrating values of the read credit for a particular SU (flash block) using the general formula for read credit: $RC[SU]=RDL-sm-x*f_{rw}-y$, wherein RDL is the read disturb limit and is a constant, sm is a safety margin and is a constant, x is the valid count (VC), and y is a number of reads or the read disturb count (RDC).

By maintaining the Read Credit, calculated using this formula, above certain level, it is guaranteed that LUs in any given SU are being invalidated (Valid Count going down) at least at a proportional rate as a number of reads from this SU increases (or maybe even faster). As a result, by the time vendor-defined RDL is reached, the number of valid LUs in an SU has been reduced, gradually, to zero. The LUs are often invalidated "naturally" as other processes are writing out new copies of the same LUs elsewhere. But if pace of such "natural" decay cannot keep up with the pace of reads, additional LU rewrites should be scheduled proactively in order to adjust the invalidation pace to read pace. Such proactive adjustments during the reading and writing of an SU is different than other known approaches that wait until a number of reads hits a limit before starting any data movement. Such constant adjustment of the LU invalidation rate avoids spikes in performance due to data relocation avalanches.

Different zones for the read credit 600 are shown where actions by the controller are taken. At 610, the valid count and number of reads (nR) is zero, such as just after a block being erased in the case of flash memory. For a period of time, reads (nR→nR+1), writes (VC→VC+1) and data invalidations for any reason (VC→VC−1) are taking place simultaneously, as indicated at 620. Data invalidations do not necessary happen due to rewrites, triggered by the Read Disturb Limit. An LU could be invalidated because another (newer) instance has been written elsewhere or as a result of garbage collection, not related to Read Disturb. If such invalidation happens before SU is completely filled, VC may never reach its maximum amount.

However, in many embodiments, SU is often being filled by data to its full capacity during which normally very little if any reads and data invalidations happen, as indicated at 630. Later RC oscillates around 0—going down due to reads (at least NAND flash cannot accept more data after this point after all physical pages in a block are written), and going up due to data invalidation. As long as RC≥−rda (a constant read disturb allowance), Read Disturb does not trigger any rewrites by itself. The RC range −rda<RC≤RDL−sm is considered a "no data movement zone" 632.

In contrast, a "Data movement zone" 634 is the RC range −sm≤RC<−rda. In this zone, LU rewrites can be scheduled. In some embodiments where the information is available regarding frequency of read accesses to certain LBA ranges, LU candidates for relocation can be selected from most frequently read LBA ranges. That reduces the speed of RC[SU] decreasing (since remaining LUs are being read less often), reducing chances of future data movements.

Finally, zone 640 below $f_{rw}$ is a "Blocking data movement zone", reads from the affected SU should be blocked. This is safety measure and single completed rewrite moves RC out of this zone because it will increase it exactly by $f_{rw}$.

It is useful to evaluate numerical values of the variables. In the case of NAND flash, blocks can be a size of 16 MB, with a typical LU being 4 KB (so $V_{max}$~4 k). The Read Disturb Limit, measured in number if single page reads, is typically ~5M in the beginning of flash life, going down to ~512K in the end of life so $f_{rw}$~100-1000. The Safety Margin (sm) could be about ~10K and Read Disturb Allowance (rda) ~1K. Valid Count VC[SU] and the number of reads can be maintained in separate tables and RC calculated each time one of them changes or a single Read Credit table can be maintained that includes the necessary information and is updated in accordance with the rules described herein.

Figure 7:
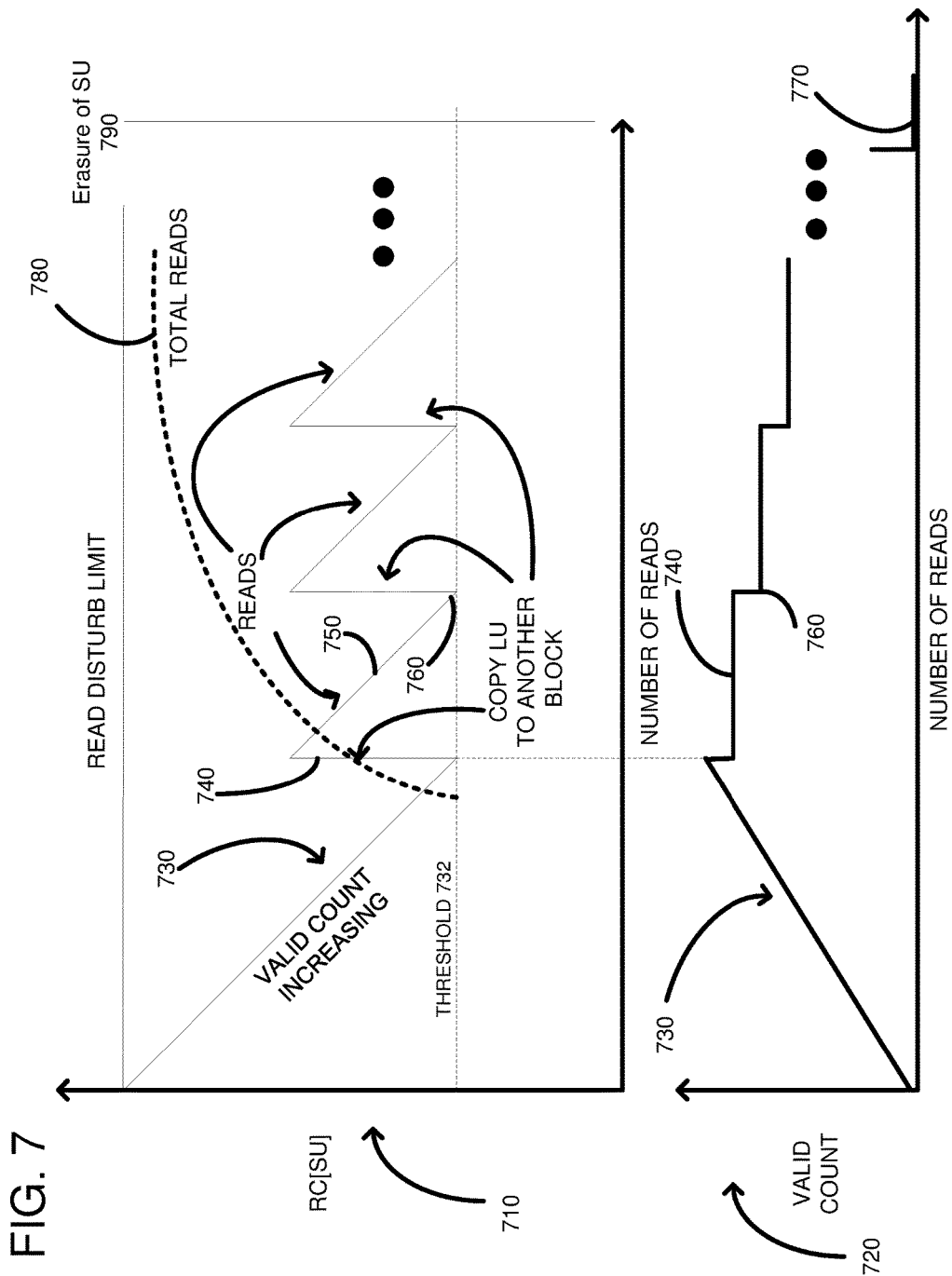
FIG. 7 is a timing diagram of the read credit variable and how data is gradually copied from the storage unit with intermediate reads occurring between copying of pages.

FIG. 7 shows two graphs of RC 710 and valid count 720 over a time period, as an example of what can occur in the system described herein. For a first period of time, after an initial erasure of an SU at time 0, a valid count increases as shown at 730 in both graphs. Once a threshold 732 is reached due to reads occurring and the valid count being at a level that decreases RC to the threshold, a LU (e.g., page) is copied out (rewritten) of the SU as indicated at 740. After that time, intermediate reads and writes can occur, but for simplicity of illustration only reads are shown at 750. At a point 760, the threshold is reached again, and another LU is copied out of the SU, further reducing the valid count. The threshold is repeatedly reached and LUs are repeatedly moved out without an erasure occurring as shown by the graphs 710 and 720. The valid count gradually and continuously decays in a stepwise manner until it reaches a value of zero as shown at 770. This point is reached prior to the total reads reaching a read disturb limit as shown at 780. At this point, an erasure can occur as shown at 790. Thus, the threshold 732 is reached multiple times and a single LU is copied out of the block each time between erasures of the block. During this time and between the different LUs being copied, reads and writes can occur to the SU without intermediate erasures of the SU. It will be understood that "copying", "moving", or "rewriting" a LU for purposes of read disturb handling means that the original block is invalidated in favor of the new block receiving the copy.

Figure 8:
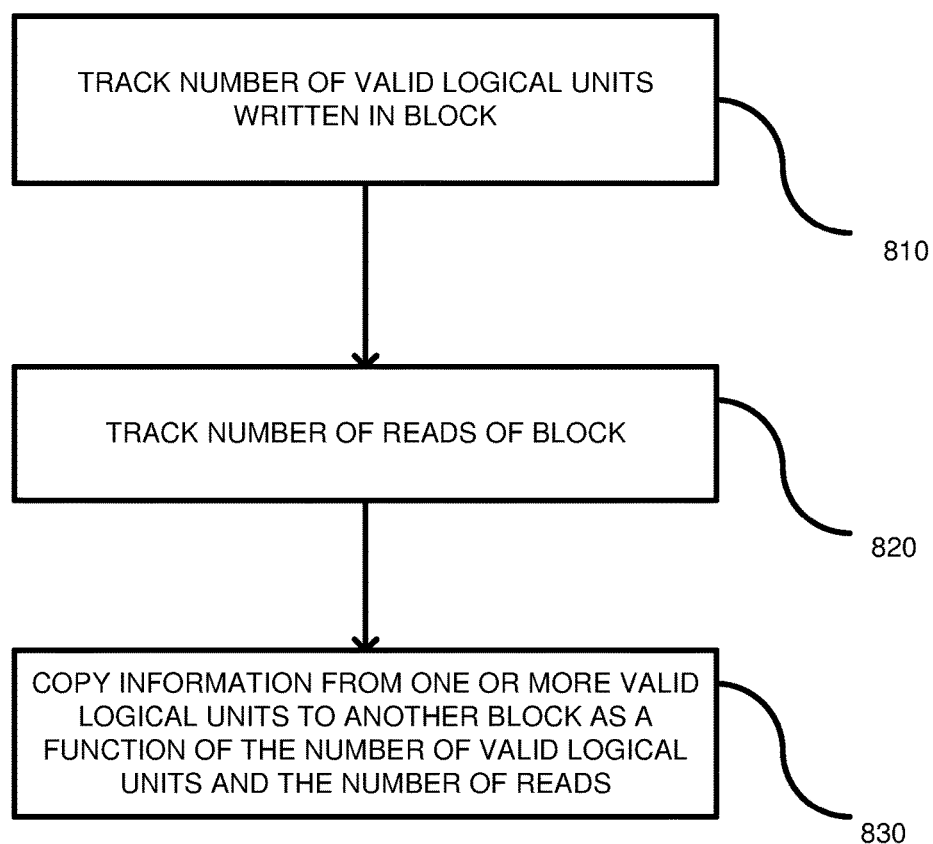
FIG. 8 is a flowchart according to one embodiment for read disturb handling in storage devices.

FIG. 8 is a flowchart of a method for handling read disturbs in a nonvolatile medium. In process block 810, a number of valid LUs can be tracked. For example, with flash memory, writing data to a LU in a block creates a valid LU, resulting in an incrementing of the number of valid LUs. FIG. 2 shows an example of a table 260 for maintaining the valid count on a per block basis. In process block 820, a number of reads of the block can be tracked. For example, FIG. 2 shows a read count 240 being tracked for each individual LU. Finally, in process block 830, information is copied from one or more valid LUs to another block as a function of the number of valid LUs and the number of reads. For example, a read credit can be calculated that is a function of a number of valid LUs and a number of reads of those LUs. The read credit can be decreased when the number of valid LUs increases, increased when the number of valid LUs decreases, and decreased when data is read from the block. A controller can monitor the read credit and copy a valid LU to another block when the read credit reaches a threshold value. When a valid LU is copied from a first block to a second block, it is invalidated in the first block and becomes valid in the second block.

Figure 9:
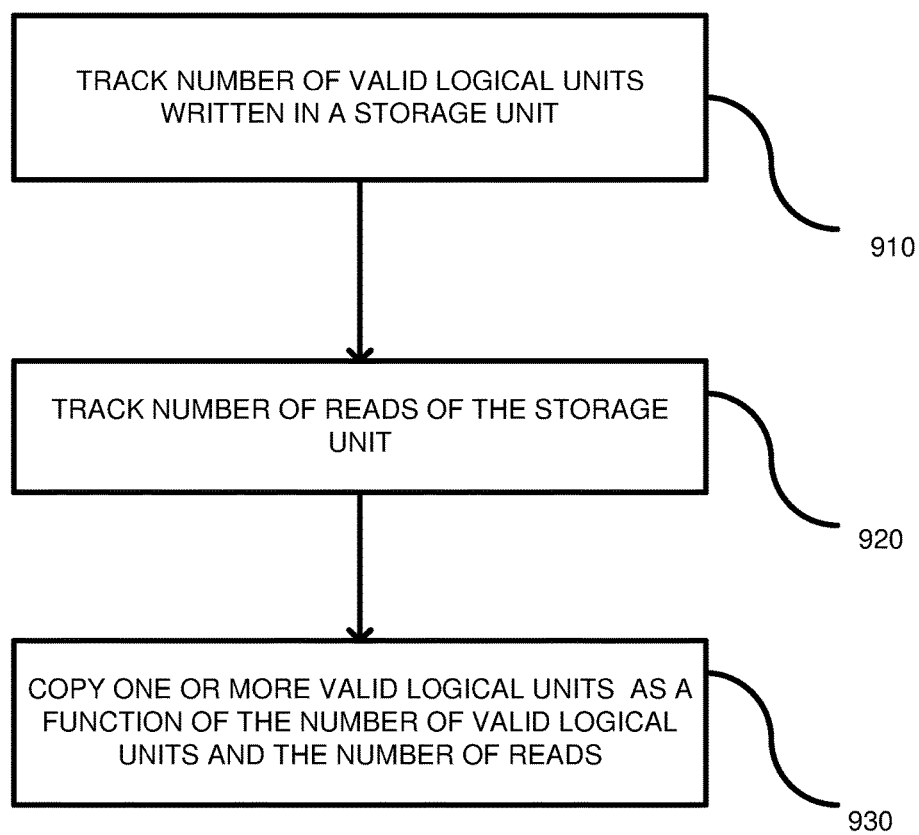
FIG. 9 is a flowchart according to another embodiment for read disturb handling in storage devices.

FIG. 9 is a flowchart according to another method for handling read disturbs in a nonvolatile medium. In process block 910, a number of valid LUs is tracked on a per-storage-unit basis. Tracking includes maintaining a count of a number of valid LUs per block. In process block 920, a number of reads of the SU can be tracked. Tracking of the number of reads can be maintaining an overall count for the SU. In process block 930, one or more valid LUs are copied as a function of the number of valid LUs and the number of reads of the SU. An example formula for such a function can be as follows: RC[SU]=RDL−VC*constant−Number of Reads. The value of the constant can be related to the formula $f_{rw}$=RDL/$VC_{max}$. An example value of RDL can be $5*10^6$, whereas $VC_{max}$ (i.e., a maximum number of LUs in an SU) can be about 1000. Thus, the constant can be about 5000, in this particular example. Other formulas and constants can be used.

Example Computing Environment

Figure 10:
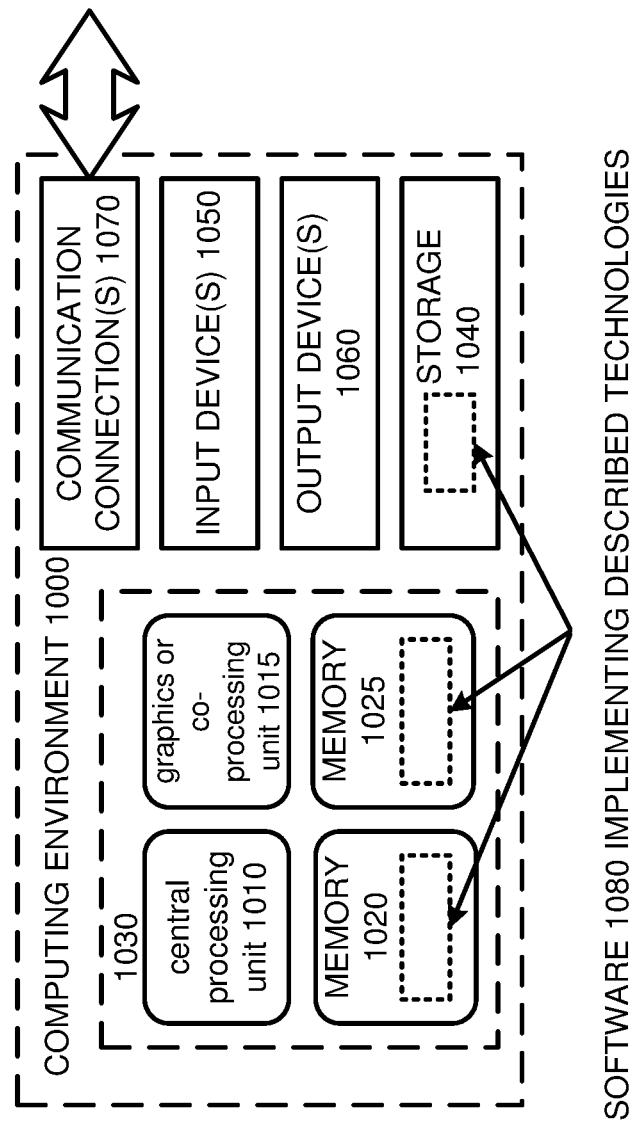
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. I therefore claim as my invention all that comes within the scope of these claims.

What is claimed is:

1. A solid state storage device, comprising:
   a flash memory; and
   a controller coupled to the flash memory, the controller configured to:
   store user data in the flash memory in blocks in the form of Logical Units;
   track a number of valid Logical Units written within a first block of the flash memory;
   track a number of reads of the first block of the flash memory; and
   copy information from one of the valid Logical Units to a second block of the flash memory, the copying being performed as a function of the number of the valid Logical Units and the number of reads to the first block so as to maintain a proportionality between the number of valid Logical Units and the number of reads;
   wherein the controller is further configured to track a read credit for the blocks of the flash memory, the read credit being decreased when the number of valid Logical Units increases, being increased when the number of valid Logical Units decreases, and being decreased when data is read from the first block.

2. The solid state storage device of claim 1, wherein the copying of information from the valid Logical Units from the first block is distributed over a period of time with intervening writes or reads of the first block.

3. The solid state storage device of claim 1, wherein the controller is further configured to monitor the read credit and initiate the copying the information from the one of the valid Logical Units when the read credit reaches a threshold value, and wherein the controller is configured to invalidate the copied Logical Unit from the first block.

4. The solid state storage device of claim 1, wherein the controller is further configured to select the one of the valid Logical Units to copy from, wherein the selection is based on the one of the valid Logical Units having been read a greatest number of times.

5. A method of managing a non-volatile memory, comprising:
   tracking a number of valid logical units that are within a storage unit of the non-volatile memory;
   tracking a number of reads of the storage unit; and
   copying one of the valid logical units, wherein the copying is performed as a function of the number of reads of the storage unit and the number of valid logical units;
   wherein the copying is based on a read credit which is decreased when the number of valid logical units increases, which is increased when the number of valid logical units decreases, and which is decreased when data is read from the storage unit.

6. The method of claim 5, wherein the copying of the valid logical unit is distributed over a period of time wherein intervening writes or reads to the storage unit occur during the period of time.

7. The method of claim 5, wherein the non-volatile memory is a flash memory and the storage unit is a block of memory.

8. The method of claim 5, wherein a controller coupled to the storage unit performs the copying.

9. The method of claim 5, further including tracking a read credit and wherein the copying is triggered by the read credit reaching a threshold value, wherein the read credit is based on a formula $RC=RDL-x*f_{rw}-y$, wherein RC is the read credit, RDL is a constant limit on a number of reads recommended before the storage unit should be erased, x is a number of valid logic units, $f_{rw}$ is a constant, and y is the number of reads.

10. The method of claim 5, wherein the number of reads is maintained in proportion to the number of valid logical units.

11. The method of claim 5, wherein the tracking of the number of valid logical units includes storing that a logical unit has been written to.

12. The method of claim 5, wherein the copying includes selecting the one of the valid logical units from amongst the number of valid logical units, wherein the selection is based on the one of the valid logical units having been read a greatest number of times.

13. A system, comprising:
    a nonvolatile medium including first and second storage units, each storage unit having a plurality of logical units;
    a processor in communication with the nonvolatile medium, the processor configured to:
    copy valid logical units from the first storage unit to the second storage unit, the copying being based on a number of valid logical units in each storage unit;
    wherein the copying is based on a read credit which is decreased when the number of valid logical units increases, which is increased when the number of valid logical units decreases, and which is decreased when data is read from the storage unit.

14. The system of claim 13, wherein the copying is further based on a number of reads associated with each storage unit.

15. The system of claim 13, wherein the system is a solid state drive (SSD).

16. The system of claim 13, wherein the processor is further configured to track a number of reads associated with each storage unit and the number of valid logic units within each storage unit.

17. The system of claim 13, wherein the nonvolatile medium is a flash memory, and the first and second storage units are blocks of memory.

18. The system of claim 13, wherein the processor is configured to maintain a number of valid logical units in each storage block inversely proportional to a number of reads associated with each respective storage block.

19. A method of managing a non-volatile memory, comprising:
    tracking a number of valid logical units that are within a storage unit of the non-volatile memory;

tracking a number of reads of the storage unit;
copying one of the valid logical units, wherein the copying is performed as a function of the number of reads of the storage unit and the number of valid logical units; and
tracking a read credit and wherein the copying is triggered by the read credit reaching a threshold value, wherein the read credit is based on a formula $RC=RDL-x*f_{rw}-y$, wherein RC is the read credit, RDL is a constant limit on a number of reads recommended before the storage unit should be erased, x is a number of valid logic units, $f_{rw}$ is a constant, and y is the number of reads.

* * * * *